J. G. VINCENT.
MOTOR VEHICLE.
APPLICATION FILED SEPT. 7, 1917.

1,424,694.

Patented Aug. 1, 1922.
2 SHEETS—SHEET 1.

INVENTOR
Jesse G. Vincent,
BY
Foster Freeman Watson + Coit
ATTORNEY

J. G. VINCENT.
MOTOR VEHICLE.
APPLICATION FILED SEPT. 7, 1917.
1,424,694.
Patented Aug. 1, 1922.
2 SHEETS—SHEET 2.
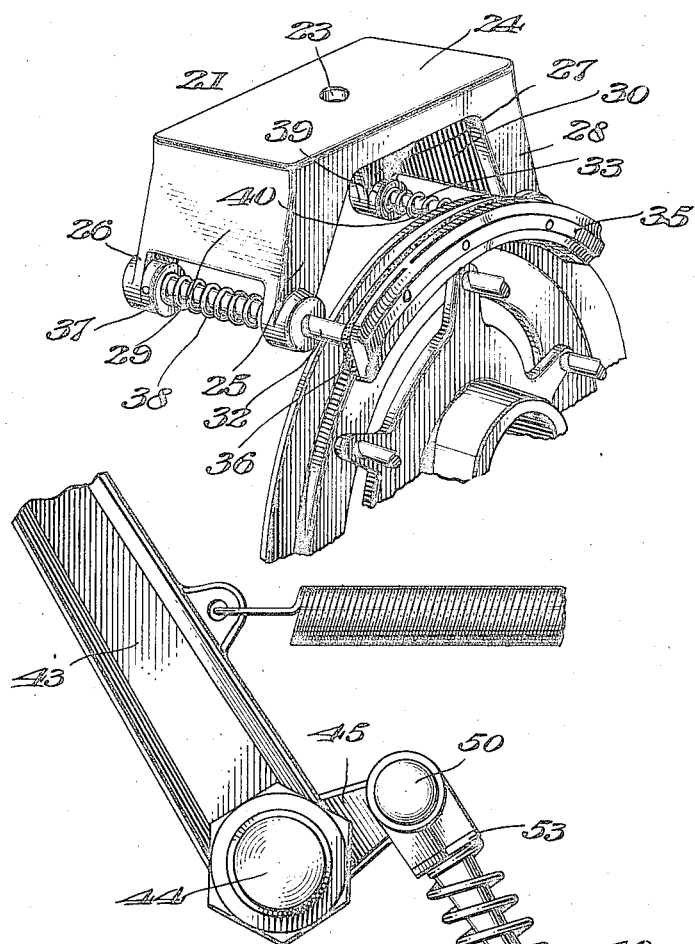
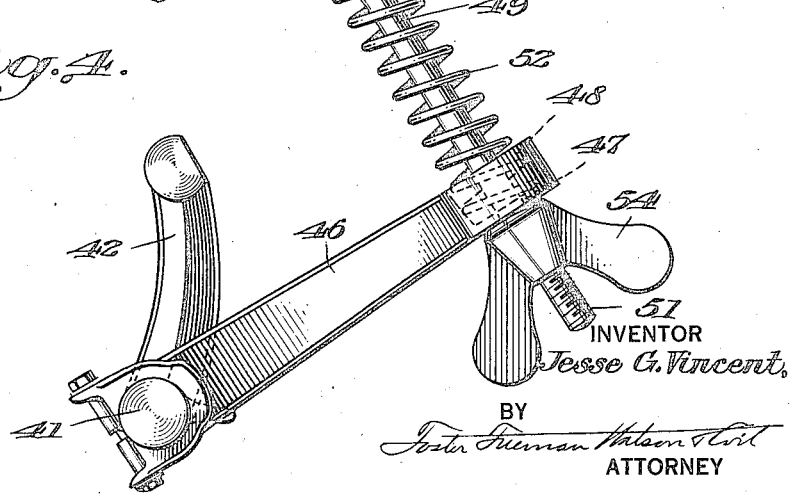
INVENTOR
Jesse G. Vincent,
BY
ATTORNEY

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

1,424,694.    Specification of Letters Patent.    Patented Aug. 1, 1922.

Application filed September 7, 1917. Serial No. 190,242.

*To all whom it may concern:*

Be it known that I, JESSE G. VINCENT, a citizen of the United States, and residing at Detroit, Wayne County, State of Michigan, have invented certain new and useful Improvements in Motor Vehicles, of which the following is a specification.

This invention relates to motor vehicles and more particularly to the clutch thereof.
The principal objects of the invention are to provide a simple and reliable means for retarding or braking the rotation of the driven clutch member when disengaged which can be easily and quickly assembled or removed from operative position and to provide an improved means for operating the clutch. Other objects and novel features will be apparent from the description taken in connection with the drawings, in which:—
Figure 1 is a longitudinal sectional elevation through a clutch casing, the clutch being shown partially in elevation and partially in section;

Figure 3 is a perspective view of the principal parts of the clutch brake;

Figure 4 is a side elevation, showing the arrangement of the levers and links for actuating the clutch.

Figure 1:
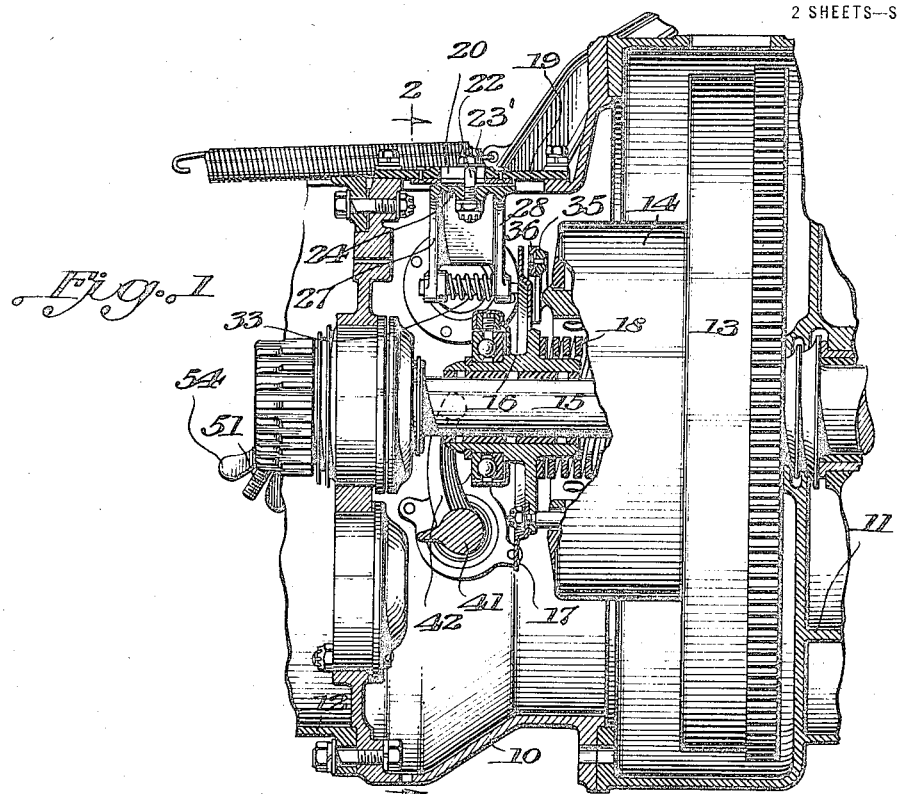

Referring to the drawings, the reference character 10 indicates the clutch casing which at the forward end may be connected to the crank case 11 of a hydrocarbon motor, and at the rearward end may be joined to the transmission casing 12 of the motor vehicle. The fly wheel 13 of the motor carries a clutch housing 14 within which the principal parts of the clutch may be located. Any desired form of clutch may be used to connect the fly wheel 13 which forms the driving member to the shaft 15, which constitutes the driven member. Mounted on the shaft 15 for sliding movement is a sleeve 16, which carries a disk 17. The sleeve is normally forced toward the left, as viewed in Figure 1 by means of a spring 18 to thus cause the engagement of the clutch. For the purpose of throwing the clutch out the sleeve 16 is moved to the right as viewed in Figure 1.

Figure 2:
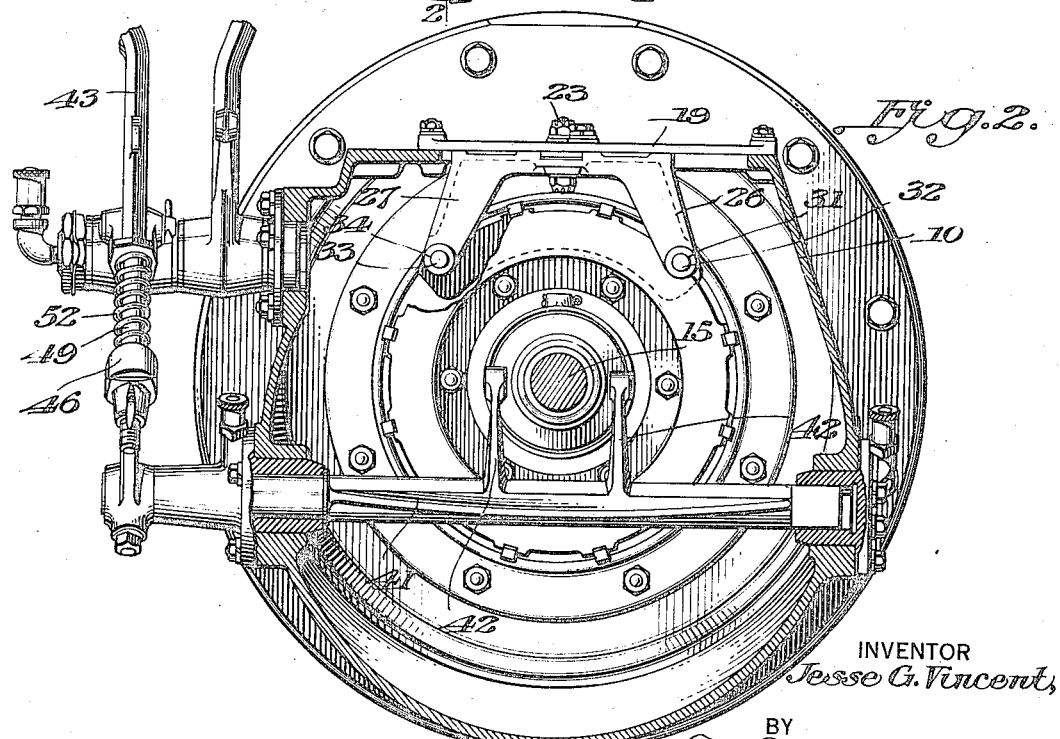
Figure 2 is a transverse sectional elevation, taken substantially on the line 2—2 of Figure 1.

As is well recognized, it is desirable to prevent spinning of the driven member of the clutch when the clutch is disengaged so that the gears in the transmission may be easily and quickly shifted. For this purpose, a brake is provided which is adapted to coact with the disk 17 of the driven member of the clutch. As shown in Figures 1 and 2, the clutch casing is provided with a removable cover 19 for the purpose of giving access to the interior of the casing. This cover is formed with a slot 20 which extends parallel with the axis of the clutch, and a brake support 21 is suspended from the cover 19 by means of a bolt 22 which extends through a central aperture 23 in the support and the slot 20 in the cover. The position of the support may be adjusted in a direction parallel with the axis of the clutch by sliding the bolt 22 in the slot 20 and clamping it in adjusted position by the nut 23'.

The support 21 comprises a flat top 24, which is adapted to seat against the undersurface of the cover 19, and a pair of arms 25—26 on one side thereof, and a similar pair 27, 28 on the other side. The arms 25, 26 may be reinforced by a web 29 and likewise the arms 27, 28 may be strengthened by a web 30. The lower end of the arms 25, 26 are formed with aligned bores 31 in which is slidably mounted the rod 32. In a similar manner a parallel rod 33 is slidably mounted in bores 34 formed in the lower ends of the arms 27, 28. These rods 32, 33, which are arranged parallel with the axis of the clutch project on one side of the support and carry a non-rotatable brake member. This brake member consists of an arcuate backing 35 provided with a facing 36 of any desired friction material. The rods 32 and 33 are located just outside of the periphery of the disk 17 and carry the brake member so that it is located between the disk and the clutch proper and in the path of movement of the disk when the clutch is disengaged. Thus as the sleeve 16 is moved to the right, as viewed in Figure 1, to disengage the clutch, the disk 17 will contact with the brake member, thereby retarding and stopping the rotation of the driven clutch member. In order that this braking action may continue, with the disengaging action of the clutch, it is necessary that movement of the disk 17 or the brake member be either mounted for yielding movement. In the drawings the brake member is shown as being mounted for yielding movement in a direction longitudinal of the clutch. For this purpose the rod 32 has a collar 37 secured thereto and a spring 38 is interposed between the collar and the arm 25. In a similar manner the rod 33 has a collar 39 secured thereto, and a spring 40 is interposed between the collar and the arm 28. It will be apparent that the springs 38 and 40 act to resist movement of the brake member in the disengaging direction of the driven clutch member. That is to say, the springs resist the movement of the brake member to the right, as viewed in Figure 1.

The means for actuating the clutch will now be described. This means consists of a rock shaft 41, located below the driven shaft 15 of the clutch and mounted within the clutch casing but having one end thereof projecting at one side of the casing. This rock shaft is provided with a pair of spaced arms 42 which are adapted to act on the clutch sleeve 16 to move it towards the right, as viewed in Figure 1. For the purpose of turning this rock shaft, a pedal 43 is mounted on a stub shaft 44, carried by the clutch casing, and this pedal has connected thereto for rotation therewith an arm 45. The projecting end of the rock shaft 41 has secured thereto an arm 46, the end of which is formed with a bore 47, and counterbore 48. A link 49 is pivoted, as at 50 to the arm 45 and has a threaded end 51 which projects through the bore 47. A coil spring 52 surrounds the link 49 and is interposed between a shoulder 53 on the link and the arm 46, the corresponding end of the spring being seated in the counter bore 48. The length of the link 49 is adjusted by a thumb nut 54 on the threaded end 51.

From the foregoing, it will be apparent that when the pedal 43 is depressed the arms 42 on the rock shaft will be moved in a direction to disengage the clutch. The spring 52 acts to keep the arms 45, 46 in proper spaced relation and yet permits an easy and quick adjustment by merely turning the thumb nut 54.

Although a specific construction has been described, it will be apparent that the details thereof may be greatly varied without departing from the spirit of the invention.

Having thus described my invention, what I claim as new and desire to secure by Letters Patent is:—

1. In combination with a clutch casing having a removable cover, a clutch within the casing, means for retarding the rotation of the driven clutch member when disengaged including a support removably fastened to said cover, and a brake member mounted on said support for yielding sliding movement.

2. In combination with a clutch casing having a removable cover at the top thereof and a clutch therein, means for retarding the rotation of the driven clutch member when the clutch is disengaged including a disk carried by the driven clutch member, a support depending from said cover, rods slidably carried by said support, and a brake member carried by the rods arranged in the path of the disk, one of said two last mentioned parts being yieldably mounted.

3. In combination with a clutch casing having a removable cover, a clutch within the casing, means for retarding rotation of the driven member of the clutch when the latter is disengaged, comprising a support carried by the cover, a brake member slidably mounted on said support for movement parallel to the axis of the clutch, a disk rigidly secured to the driven clutch member, adapted to engage the brake member when disengaged and yielding means resisting sliding movement of said brake member, in one direction.

4. In combination a clutch casing, a clutch therein, said casing having a removable cover, means for retarding the rotation of the driven member of the clutch when the clutch is disengaged, including a support carried by said cover and having a plurality of arms, parallel spaced rods slidably carried by said arms, a brake member carried by said rods and springs for resisting movement of said brake member in one direction.

5. In combination a clutch casing having a removable cover, a clutch within said casing, a support adjustably secured to said cover, a brake member slidably carried by said support for retarding the rotation of the driven member of the clutch when the clutch is disengaged, and means yieldingly resisting movement of said member in one direction.

6. In combination, a clutch casing having a removable cover, a clutch within said casing, a support secured to said cover for adjustment in the direction parallel to the axis of the clutch by a pin and slot connection, a member slidably carried by said support for retarding the rotation of the driven member of the clutch when the clutch is disengaged, and yielding means resisting movement of said member in one direction.

In testimony whereof I affix my signature.

JESSE G. VINCENT.